United States Patent [19]
Merrill et al.

[11] Patent Number: 5,923,369
[45] Date of Patent: Jul. 13, 1999

[54] ACTIVE PIXEL SENSOR CELL WITH DIFFERENTIAL AMPLIFIER AND ARRAY INCLUDING SAME

[75] Inventors: Richard B. Merrill, Woodside; Kevin Brehmer, San Jose, both of Calif.

[73] Assignee: Foveonics, Inc., Cupertino, Calif.

[21] Appl. No.: 08/898,896

[22] Filed: Jul. 23, 1997

[51] Int. Cl.$^6$ .................................................. H04N 5/335
[52] U.S. Cl. .......................................... 348/301; 348/308
[58] Field of Search .................................... 348/294, 300, 348/301, 302, 307, 308, 309, 310; 257/290, 291, 292, 293; 250/208.1; H04N 5/335

[56] References Cited

U.S. PATENT DOCUMENTS

| | | | |
|---|---|---|---|
| 5,493,423 | 2/1996 | Hosier | 348/300 |
| 5,541,654 | 7/1996 | Roberts | 348/301 |
| 5,631,704 | 5/1997 | Dickinson et al. | 348/308 |

OTHER PUBLICATIONS

R.H. Nixon et al., "256×256 CMOS Active Pixel Sensor Camera–on–a–Chip," IEEE International Solid–State Circuits Conference, Session 11, Paper FA 11.1 (1996).

*Primary Examiner*—Tuan V. Ho
*Attorney, Agent, or Firm*—Limbach & Limbach L.L.P.

[57] ABSTRACT

An active pixel sensor cell array in which a differential amplifier (whose output is fed back to one of its inputs) amplifies the output of each cell. By using such differential amplifiers, fixed pattern noise in the image data generated by reading the array is reduced. Part of the differential amplifier for each cell is within the cell itself and a current source and tail current sink for the differential amplifier are implemented outside the cell and shared by all cells connected along a column of the array. Preferably, the output amplifier circuitry within each cell includes no PMOS transistor (although it typically includes NMOS transistors). Another aspect of the invention is an active pixel sensor cell including part of a differential amplifier (having an output fed back to one of its inputs, and configured to assert an amplified signal indicative of a sampled output voltage of the cell's photodiode), and circuitry (physically separate from the cell) implementing a remaining portion (e.g., a current source and tail current sink) of the differential amplifier.

26 Claims, 2 Drawing Sheets

000

ACTIVE PIXEL SENSOR CELL WITH DIFFERENTIAL AMPLIFIER AND ARRAY INCLUDING SAME

FIELD OF THE INVENTION

The present invention pertains to use of a differential amplifier as an output amplifier for a cell of an active pixel sensor cell array. In preferred embodiments, the invention is an active pixel sensor cell and a differential amplifier for amplifying the cell's output, and an active pixel sensor cell array whose cells' outputs are amplified by differential amplifiers so that the array's image data output exhibits reduced fixed pattern noise.

DESCRIPTION OF THE RELATED ART

Charge-coupled devices (CCDs) have been the mainstay of conventional imaging circuits for converting photons incident at individual pixel sensor cells (of a pixel sensor cell array) into electrical signals indicative of the intensity of light energy incident at each cell. In general, a CCD uses a photogate to convert light energy incident at a cell into an electrical charge, and a series of electrodes to transfer the charge collected at the photogate to an output sense node.

Although CCDs have many strengths, including high sensitivity and fill-factor, CCDs also suffer from a number of weaknesses. These weaknesses include limited readout rates and dynamic range limitations, and notably, the difficulty in integrating CCDs with CMOS-based microprocessors.

To overcome the limitations of CCD-based imaging circuits, imaging circuits have been developed which use active pixel sensor cells to convert pixels of light energy into electrical signals. An active pixel sensor cell typically includes a conventional photodiode and a number of transistors which provide amplification, readout control, and reset control in addition to producing the electrical signal output from the cell.

FIG. 1 is an example of two identical CMOS active pixel sensor cells (10 and 11) having conventional design, connected along a column of an active pixel sensor cell array, and circuitry 21 for use in reading all cells connected along the column.

As shown in FIG. 1, cell 10 includes photodiode d1 (connected as shown between ground and Node 3), and reset transistor N1. Transistor N1 is an NMOS transistor whose drain is connected to a power supply node (Node 1) maintained at potential $V_{cc}$, whose source is connected to Node 3, and whose gate is connected to Node 2. The gate of transistor N1 is controlled (in a manner to be described below) by a RESET voltage supplied to Node 2.

Cell 10 also includes buffer transistor N2 and row select transistor N3, each of which is an NMOS transistor. Transistor N2 has a drain connected to Node 1, a source connected to Node 4, and a gate connected to Node 3. Transistor N3 has a drain connected to Node 4, a source connected to Node 6, and a gate connected to Node 5. The gate of transistor N3 is controlled (in a manner to be described below) by a ROW SELECT voltage supplied to Node 5.

As shown in FIG. 1, circuitry 20 includes detection and calculation circuit 21 whose input terminal is connected to Node 6. Circuit 21 includes a sense amplifier which outputs digital data indicative of light intensity incident at each selected cell along the column in response to voltages at Node 6 during a sampling period when each such cell is selected. Circuit 21 typically also implements correlated double sampling ("CDS") or another post-processing method on the digital data output from the sense amplifier.

In normal operation, circuit 21 receives a sequence of voltages at Node 6 (which node is common to all cells connected along the column), with each pair of consecutive voltages being indicative of light intensity incident (during a sampling period) at a different one of the cells along the column.

Circuitry 20 also includes NMOS transistor N6 (whose drain is connected to Node 6 and whose source is connected to ground) and a current mirror (comprising current source I1 and NMOS transistors N4 and N5 connected as shown) which provides the necessary load for reading out the cells. Transistor N5 of the current mirror preferably sinks no more than a small current (from Node 6 to ground), since fixed pattern noise resulting from mismatches in the channel lengths of the buffer transistors in the cells will increase with increasing current sunk by the current mirror.

The gate of transistor N6 (at Node 8) is controlled by a Column Reset signal. Use of a column reset transistor such as transistor N6 is described in the U.S. patent application entitled "Active Pixel Sensor Cell that Reduces Noise in the Photo Information Extracted from the Cell," filed on Jun. 9, 1997, naming Richard B. Merrill as inventor and assigned to the assignee of the present application.

Briefly, in operation of the FIG. 1 array, transistor N6 is used as a switch to place a defined voltage (ground potential) on Node 6 before circuit 21 reads one of the cells (e.g., cell 10). Preferably, the gate of transistor N6 is pulsed with a high level of column reset voltage "COLUMN RESET" prior to each pulsing of the row select voltage ROW SELECT. By pulsing the column select voltage COLUMN RESET just prior to each pulsing of the row select voltage ROW SELECT, the voltage at Node 6 is pulled to zero (ground potential) just prior to reading of the relevant one of the cells. When the voltage on Node 6 is set to zero immediately prior to pulsing the row select voltage, resulting noise (in the data determined by circuit 21) is reduced substantially. For example, in one implementation of FIG. 1, the noise is reduced from approximately 15 mV (in the case that N6 remains "off" at all times) to approximately one millivolt.

Also in accordance with the teaching of the U.S. patent application entitled "Active Pixel Sensor Cell that Reduces Noise in the Photo Information Extracted from the Cell," filed Jun. 9, 1997, switch transistor N6 is optionally replaced by a switch transistor whose channel terminals are connected between Node 6 and power supply Node 1, and whose gate is coupled to receive the column select voltage COLUMN RESET. By pulsing the voltage COLUMN RESET just before each pulsing of the row select voltage, the switch transistor pulls up the voltage at Node 6 to voltage Vcc just prior to reading of each cell. This technique also reduces noise in the data determined by circuit 21.

The operation of sampling (reading) each cell (e.g., cell 10) begins by briefly pulsing the gate of the cell's reset transistor N1 with a high level of reset voltage "RESET." This high level of the reset voltage (typically equal to Vcc, where Vcc is typically 5 volts) resets the voltage on photodiode d1 to an initial integration voltage to begin an image collection cycle.

Immediately after assertion of such pulse of the voltage signal "RESET," the initial integration voltage on photodiode d1 (the voltage at Node 3) is $V_{ini}=\text{VRESET}-V_{TN1}-V_{CLOCK}$, where $V_{TN1}$ is the threshold voltage of transistor N1, VRESET is the high level of the voltage signal "RESET," and $V_{CLOCK}$ represents reset noise from the pulsed reset voltage (assumed to be constant). Similarly, the initial integration voltage at Node 4 is VRESET$-V_{TN1}-V_{CLOCK}-V_{TN2}$, where $V_{TN2}$ is the threshold voltage of buffer transistor N2 (functioning as a source follower).

After the reset voltage has been pulsed and the voltage on photodiode d1 (the voltage at Node 3) has been reset, the gate of transistor N3 is pulsed with a high level of row select voltage signal "ROW SELECT." The high level of the row select voltage causes the voltage at Node 4, which represents the initial integration voltage of the cycle, to appear at Node 6. Detection and calculation circuit 21 then amplifies, digitizes, and stores the value of the initial integration voltage as it appears at Node 6.

Next, for a selected time period, photons are allowed to strike photodiode d1, thereby creating electron-hole pairs. Photodiode d1 is designed to limit recombination between the newly formed electron-hole pairs.

As a result, the photogenerated holes are attracted to the ground terminal of photodiode d1, while the photogenerated electrons are attracted to the positive terminal of photodiode d1, each additional electron reducing the voltage at Node 3. At the end of this image collection cycle, a final integration voltage will be present at Node 3. The final integration voltage is $V_f = V_{ini} - V_S =$ VRESET$-V_{TN1}-V_{CLOCK}-V_S$, where $V_S$ represents the change in voltage (at Node 3) due to the absorbed photons. Similarly, the final integration voltage at Node 4 is VRESET$-V_{TN1}-V_{CLOCK}-V_{TN2}-V_S$.

At the end of the image collection cycle, the gate of transistor N3 is again pulsed with a high level of row select voltage signal "ROW SELECT" to cause the voltage at Node 4, which represents the final integration voltage of the cycle, to appear at Node 6. Detection and calculation circuit 21 amplifies and digitizes the value of the final integration voltage as it appears at Node 6, and generates data indicative of the number of photons that have been collected during the image collection cycle by calculating the difference ($V_S$) between the digitized final integration voltage taken at the end of the cycle and the digitized stored initial integration voltage taken at the start of the cycle.

After the final integration voltage has been latched by detection and calculation circuit 21, the reset voltage RESET is again pulsed to reset the voltage on photodiode d1 to begin another image collection cycle.

One of the problems with active pixel sensor cells (e.g., cell 10 of FIG. 1) is that during typical operation, the reset voltage RESET and the row select voltage ROW SELECT have high levels for periods (typically about 30 msec) which are sufficiently long to introduce a substantial amount of 1/f noise into the cell. Such 1/f noise, which results from trapping and detrapping of surface charges, can be accurately modeled as variations in the threshold voltages of transistors N1, N2, and N3. Due to such noise, the number of photons which are absorbed by photodiode d1 during an image collection cycle is more properly expressed as (VRESET$-V_{TN1}-V_{CLOCK}-V_{TN2}$)$-$(VRESET$-V_{TN1}-V_{CLOCK}-V_{TN2}-V_S-V_\alpha$), where $V_\alpha$ is a contribution due to variations in the threshold voltages of transistors N1, N2, and N3 due to 1/f noise. Thus, the variations in the threshold voltages of transistors N1, N2, and N3 add an error term $V_\alpha$ which erroneously yields $V_S+V_\alpha$ as the value determining the number of absorbed photons, thereby limiting the accuracy of the cell.

In some applications (as explained in U.S. patent application Ser. No. 08/707,933, filed on Sep. 10, 1996, naming Richard B. Merrill and Kevin E. Brehmer as inventors and assigned to the assignee of the present application), it is desirable to choose Vcc to be substantially less than VRESET (the high level of the reset voltage RESET). For example, Vcc may be chosen to be 3.3 volts and VRESET may be chosen to be 5 volts. This forces reset transistor N1 to operate in the linear region in which the high level of the reset voltage causes N1 to pull the voltage at Node 3 up to $V_{ini}$ in a manner subject to reduced variation due to changes in the threshold voltage of reset transistor N1 due to 1/f noise. However, this technique does not eliminate fixed pattern noise due to systematic and random variation among the characteristics of cells of an active pixel sensor cell array.

Active pixel sensor cell arrays that use a conventional source follower amplifier in each cell (e.g., arrays of the type described with reference to FIG. 1) are subject to fixed pattern noise due to systematic and random variation between cells. Such fixed pattern noise is due to many different sources of gain variation that cannot easily be corrected with post processing techniques such as correlated double sampling.

A principal source of fixed pattern noise is variable attenuation (from cell to cell) of the output voltage of the source follower amplifier (the voltage at Node 4 of FIG. 1) due to variable back bias on the source follower transistor (transistor N2). In typical implementations of active pixel sensor cell arrays having a conventional source follower amplifier in each cell, fixed pattern noise of this type can cause an error of about 5% (55 mV) in the cells' output voltage (e.g., the voltage at detection and calculation circuit 21 of FIG. 1), assuming typical (10%) variation from cell to cell in the so-called "m-factor" indicative of the amount of back bias on the source follower transistor of each cell. In other words, when a sequence of cells is read (each cell having been exposed to the same incident light energy), the difference between the highest and lowest cell output voltages (assuming 10% "m-factor" variation from cell to cell) is about 5% of the average output voltage (averaged over all cells).

It has been proposed to implement a better amplifier within each cell (which would be less subject to such gain variation from cell to cell) by including a CMOS amplifier within each cell. Such a CMOS amplifier would include at least one PMOS transistor as a current source load for high gain (in addition to one or more NMOS transistors). Unfortunately, it is not currently possible to integrate a PMOS transistor into a single cell (of an active pixel sensor cell array) without increasing the cell size to an acceptable degree.

Conventional CCD imagers are typically subject to significantly less fixed pattern noise than are active pixel sensor cell arrays that include a conventional source follower output amplifier in each cell. It would be desirable to implement an active pixel sensor cell array that is subject to no more fixed pattern noise than a conventional CCD imager, without unacceptably increasing the cell size of such active pixel sensor cell array.

SUMMARY OF THE INVENTION

In a class of embodiments, the invention is an active pixel sensor cell array in which a differential amplifier (whose output is fed back to one of its inputs) amplifies the output of each cell of the array. The differential amplifier for each cell includes a portion (e.g., NMOS transistors N2 and N3, and tail current switch N11 which is also an NMOS transistor, of FIG. 2) implemented within the cell, and a current source (e.g., PMOS transistor P1) and tail current sink (e.g., NMOS transistor N5) implemented outside the cell. The current source and tail current sink for the differential amplifier of each cell connected along a column of the array is shared by all the cells connected along the column. Thus, the array needs only one current source (and one tail current sink) for each column of cells. Preferably, the output amplifier circuitry within each cell includes no PMOS transistor (although it typically includes NMOS transistors).

Preferably, reset circuitry (e.g., PMOS transistor P4 of FIG. 2) is provided to reset the output node of each column (e.g., to reset column line C2 of FIG. 2) to a known potential at appropriate times (e.g., before each read of a cell connected along the column). This is to minimize random charge injection back into the photodiode of each cell during read operations. Optionally also, reset circuitry (e.g., PMOS transistor P3 of FIG. 2) is provided to reset the tail current line of each differential amplifier (e.g., to reset column line C3 in FIG. 2) to a known potential at appropriate times (e.g., before each read of a cell), also to minimize random charge injection back into the photodiode of each cell during read operations.

Also optionally, the array includes a switchable bias circuit configured to assert a bias voltage to the differential amplifier current source and tail current sink circuitry of each column (e.g., to transistors P1 and N5 of FIG. 2), with the bias voltage level depending on the state of a bias control signal. The bias voltage level undergoes a transition which rapidly turns off the current source and tail current sink circuitry (to reduce power consumption by the array) in response to transition of the bias control signal from a first level to a second level, and the bias voltage level undergoes a transition which causes the current source and tail current sink circuitry to conduct desired currents (needed to amplify the photodiode output of each cell to be read) in response to transition of the bias control signal from the second level to the first level.

Another aspect of the invention is an active pixel sensor cell including a first portion of a differential amplifier (whose output is fed back to one of its inputs) configured to assert an amplified signal indicative of a sampled output voltage of the cell's photodiode, and circuitry (physically separate from the cell) implementing a remaining portion (e.g., a current source and tail current sink) of the differential amplifier. Preferably, the first portion of the differential amplifier within each cell includes no PMOS transistor (although it typically includes NMOS transistors).

DETAILED DESCRIPTION OF THE PREFERRED EMBODIMENT

Figure 1:
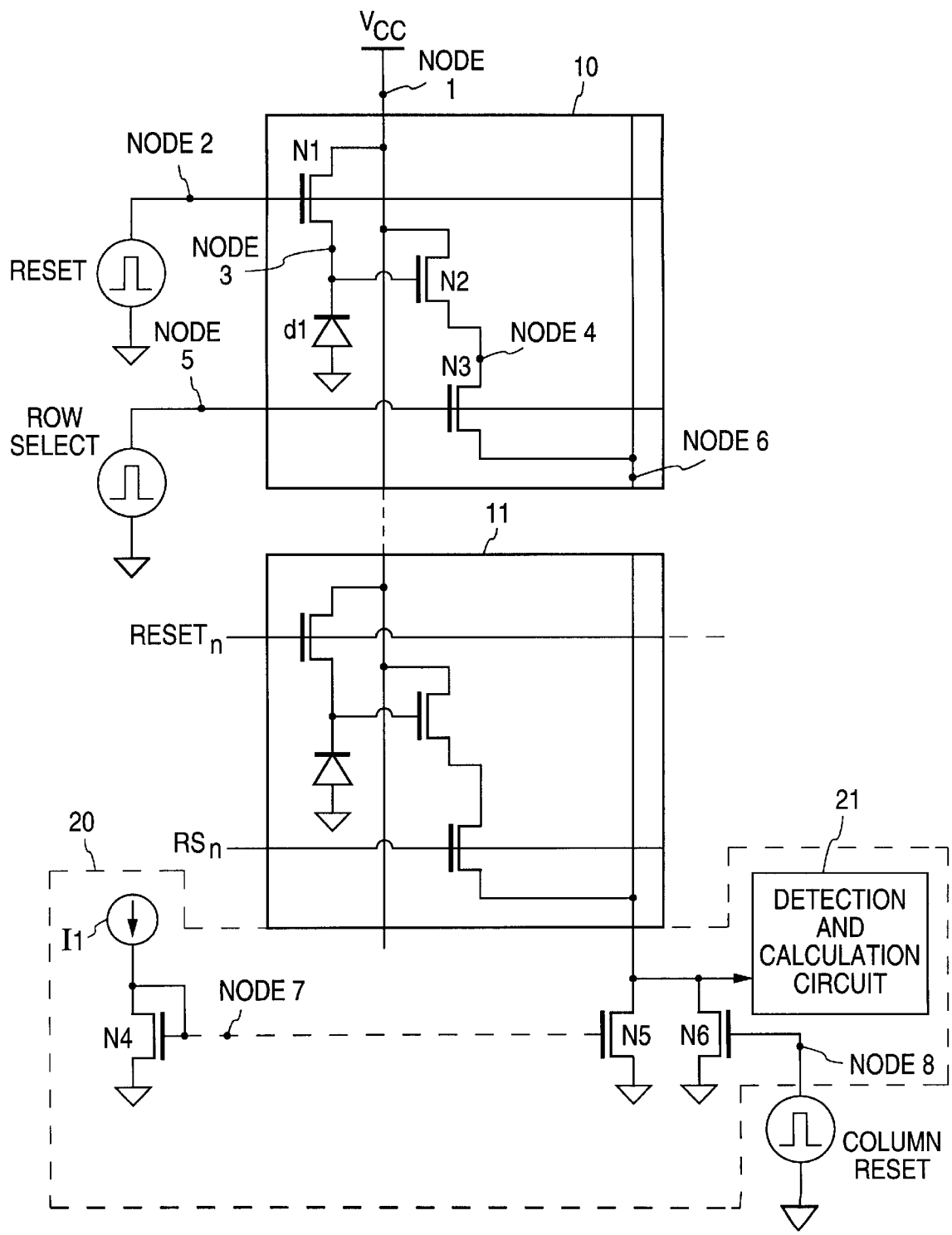
FIG. 1 is a schematic diagram of two CMOS active pixel sensor cells (having conventional design) connected along a column of an active pixel sensor cell array, and circuitry for use in reading all cells connected along the column.
Figure 2:
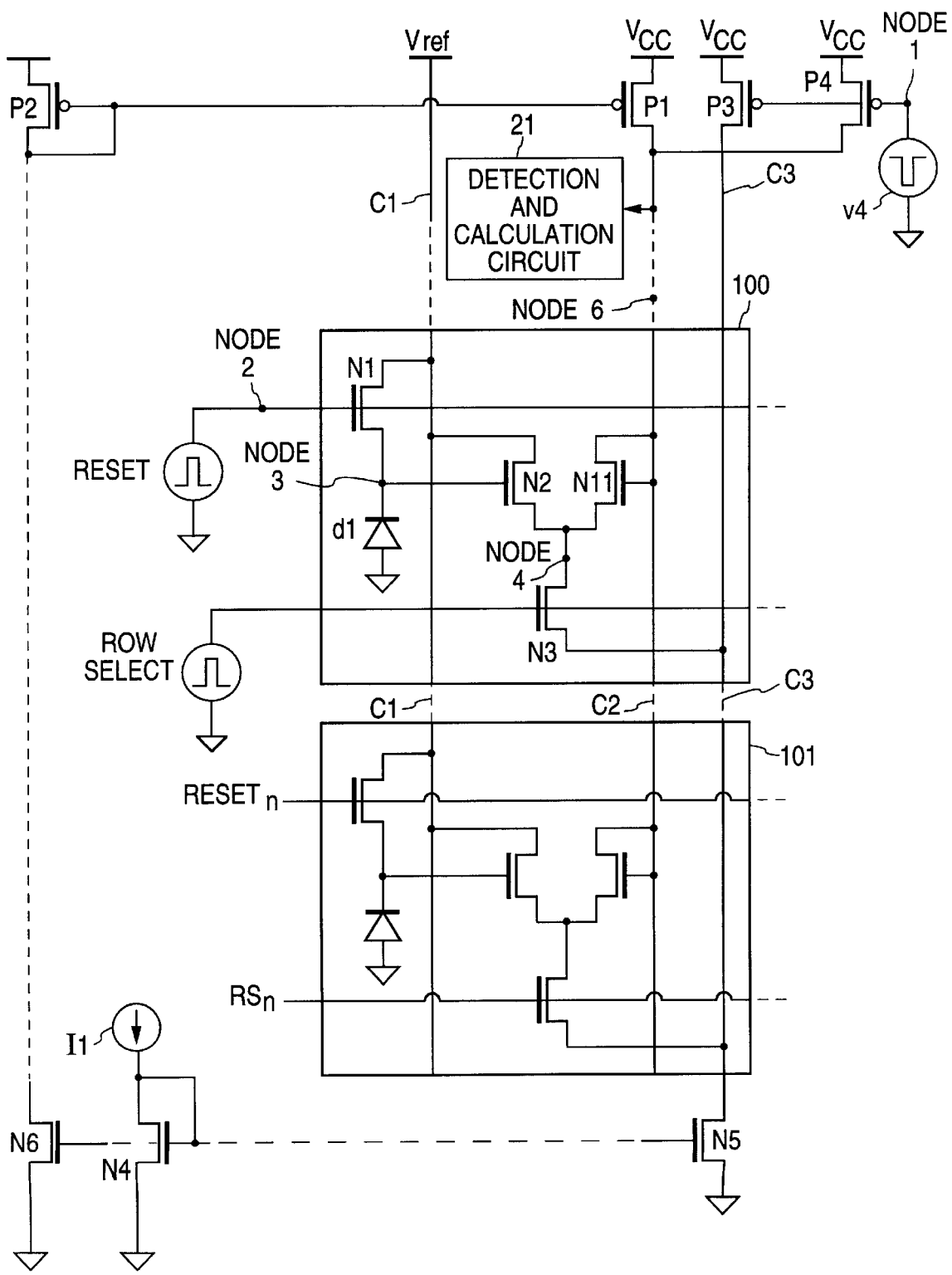
FIG. 2 is a schematic diagram of two CMOS active pixel sensor cells (which embody the invention) connected along a column of an active pixel sensor cell array, and circuitry which embodies the invention for use in reading all cells connected along the column.

FIG. 2 is a schematic diagram of a portion of an active pixel sensor array which embodies the present invention, including active pixel sensor cells 100 and 101 connected along a column of the array, and circuitry (comprising transistors P1, P2, P3, P4, N4, N5, and N6, and current source I1) for use in reading cells 100, 101, and all other cells connected along the column. Cell 100 has several structural similarities to cell 10 of FIG. 1. Thus, the same reference numerals are used in FIGS. 1 and 2 to designate the structures which are common to both cells. In FIG. 2, transistors P1, P2, P3, and P4 are PMOS transistors, and transistors N1, N2, N3, N4, N5, N6, and N11 are NMOS transistors.

With reference to FIG. 2, the column along which cells 100 and 101 are connected has three column lines: line C1 (to which the drains of N1 and N2 are coupled); line C2 (to which the gate and drain of N11, the channel of P1, and the input terminal of circuit 21 are coupled); and line C3 (to which the source of N3 and the drain of N5 are coupled). In contrast, in the FIG. 1 array, the column along which cells 10 and 11 are connected has only two column lines (one to which the drain of N1 is coupled and another to which circuit 21 is coupled). In an integrated circuit implementation, the extra wire needed to fabricate the extra column line of the FIG. 2 array can be accommodated with a minimal amount of extra space if three-layer metal is used (so that the extra wires can be implemented as a third metal layer overlaying either of the other two meal layers).

The dashed portions of lines C1–C3 indicate that additional cells (identical to cells 100 and 101) will typically also be connected along the array column including cells 100 and 101. Of course, it is contemplated that the array includes many additional columns (not shown). Thus, the signals ROW SELECT and RESET are provided simultaneously to all the cells connected along the same row as is cell 100 (i.e., to one cell in each column of the array). Similarly, the signals $RS_n$ and $RESET_n$ (which have the same function as signals ROW SELECT and RESET, respectively, but are asserted to cell 101 independently from signals ROW SELECT and RESET) are provided simultaneously to all the cells connected along the same row as is cell 101 (i.e., to one cell in each column of the array). If a separate detection and calculation circuit 21 is provided for each column, one cell from each column can be simultaneously read.

As in the FIG. 1 embodiment, NMOS transistor N1 of FIG. 2 has a drain is connected to a power supply node, a source connected to Node 3, and a gate connected to Node 2 to receive the RESET voltage. However, the power supply node in FIG. 2 is maintained at potential Vref (which is typically 3 volts), unlike power supply Node 1 of FIG. 1 which is maintained at potential $V_{cc}$ (which is typically 5 volts). As explained above in the Description of the Related Art, maintaining the power supply node at a voltage (e.g., 3 volts) lower than the high level of RESET (e.g., 5 volts) forces reset transistor N1 to operate in the linear region during resets of the photodiode, so that the high level of the voltage RESET causes N1 to pull the voltage at Node 3 up to $V_{ini}$ in a manner subject to reduced variation due to changes in the threshold voltage of reset transistor N1 due to 1/f noise.

In operation of the FIG. 2 array, the voltage (V4) at the gate of each of PMOS transistors P3 and P4 (Node 1) is pulsed low (e.g., to ground potential) before each read of a cell connected along the column including cells 100 and 101 (e.g., during a sequential read of all cells connected along the column, Node 1 is pulsed low, then cell 100 is read, then Node 1 is again pulsed low, and then cell 101 is read). The step of applying a pulse of low voltage to Node 1 resets the second and third column lines (column lines C2 and C3 in cell 100) to a known voltage (i.e., a potential substantially equal to supply voltage Vcc, which is typically 5 volts) in order to reduce variation (due to random charge injection back into photodiode d1) in the amplified output voltage asserted to circuit 21 from each cell during the operation of reading the cell.

In alternative embodiments, transistor P4 is replaced by an open circuit, and a column reset pulse is asserted to the gate of a column reset transistor whose channel is connected between ground and the bottom end of column line C2, in order to reset column line C2 to ground potential before each read of a cell (as described in the above-referenced U.S. patent application entitled "Active Pixel Sensor Cell that Reduces Noise in the Photo Information Extracted from the Cell," filed on Jun. 9, 1997). In other alternative embodiments, transistor P3 is replaced by a short circuit, transistor P4 is replaced by an open circuit, and no circuitry is provided for resetting column lines C2 and C3 when desired during operation.

With reference again to FIG. 2, after column lines C2 and C3 have been reset, a read of a cell is performed. For specificity, the following description of such a read is with reference to cell 100, although it applies (with obvious modifications) to a read of any cell of the array.

Initially, the gate (Node 2) of cell 100's reset transistor N1 is briefly pulsed with a high level of reset voltage "RESET." This high level of the reset voltage (typically equal to 5 volts) resets the voltage on photodiode d1 to an initial integration voltage to begin an image collection cycle.

Immediately after assertion of such pulse of reset voltage "RESET," the initial integration voltage on photodiode d1 (the voltage at Node 3) is $V_{ini}=VRESET-V_{TN1}-V_{CLOCK}$, where $V_{TN1}$ is the threshold voltage of transistor N1, VRESET is the high level of the voltage signal "RESET," and $V_{CLOCK}$ represents reset noise from the pulsed reset voltage (assumed to be constant).

After the reset voltage has been pulsed and the voltage on photodiode d1 (the voltage at Node 3) has been reset, the gate of transistor N3 (Node 5) is twice pulsed with a high level of row select voltage signal "ROW SELECT" to read cell 100 (a first time to assert an initial integration voltage at Node 6, and a second time to assert a final integration voltage at Node 6). Each time the gate of transistor N3 (Node 5) is pulsed with a high level of row select voltage "ROW SELECT," an amplified voltage indicative of the Node 3 voltage (the initial or final integration voltage on photodiode d1) appears on column line C2 (Node 6).

Between the assertion of the two pulses of the high level of voltage ROW SELECT at the gate of transistor N3 (Node 5), photons are allowed to strike photodiode d1, thereby creating electron-hole pairs. The photogenerated holes are attracted to the ground terminal of photodiode d1, and the photogenerated electrons are attracted to the positive terminal of photodiode d1, each additional electron reducing the voltage at Node 3. At the end of this image collection period, the following final integration voltage will be present at Node 3: $V_f=V_{ini}-V_S=VRESET-V_{TN1}-V_{CLOCK}-V_S$, where $V_S$ represents the change in voltage (at Node 3) due to the absorbed photons.

After a read operation is performed on cell 100, another cell (e.g., cell 101) can be read in essentially the same manner: the cell's second and third column lines (e.g., lines C2 and C3 for a cell connected along the column that includes cells 100 and 101) are initially reset to voltage Vcc, then the cell's photodiode is reset, and then two pulses of the high level of the row select voltage for the cell (e.g., voltage $RS_n$ for cell 101) are asserted sequentially to the cell to cause two pulses of tail current to flow from the cell's differential amplifier to ground, thus causing assertion of two output voltage pulses at the input terminal of detection and calculation circuit 21. In response to the two pulses of row select voltage, detection and calculation circuit 21 generates data indicative of the number of photons incident at the cell's photodiode during the image collection period (the time period between the two pulses of the row select voltage).

In accordance with the invention, each sampled photodiode voltage (the voltage at Node 3 in cell 100) is amplified by a differential amplifier (e.g., the differential amplifier comprising transistors N2, N3, N11, N5, and P1 connected as shown in FIG. 2) to produce an output voltage (at Node 6 in FIG. 2) which is detected and processed by a detection and calculation circuit (circuit 21 of FIG. 2). Specifically, the detection and calculation circuit amplifies, digitizes, and stores the value of an amplified initial integration voltage at its input terminal (Node 6 in FIG. 2), then amplifies and digitizes the value of an amplified final integration voltage at its input terminal, and subtracts the former digital value from the latter digital value to generate data indicative of the number of photons incident at the photodiode of a cell during an image collection cycle between two pulses of a row select voltage. The data indicative of the difference ($V_S$) between the digitized final integration voltage and the digitized initial integration voltage preferably undergoes correlated double sampling ("CDS") or other conventional post-processing in the detection and calculation circuit. The differential amplifier preferably implements feedback, with its output voltage being fed back to its inverting input.

A first portion of the differential amplifier for cell 100 comprises NMOS transistors N2 and N11 (connected as shown in FIG. 2 with their sources at Node 4, the drain of N2 coupled to column line C1, and the gate and drain of N11 connected to column line C2 and thus to the drain of P1), and NMOS transistor N3 (whose drain is connected to Node 4 and whose source is connected to column line C3). Transistor N3 functions as a switch which, when closed (in response to a high level of signal ROW SELECT), allows the differential amplifier tail current to flow to ground through NMOS transistor N5.

Transistor P1 is a current source for transistor N11 of the differential amplifier. The current through transistor P1's channel is determined by the common voltage applied to the gates of transistor P2 (of the bias circuit comprising transistors P2, N6, N4, and current source I1) and transistor P1. The bias circuit forms a current mirror with transistor P1 (the gates of transistors P2 and P1 are connected together), so that the common voltage at the gates of P1 and P2 causes corresponding current to flow through the channel of P2 (and N6) and through the channel of P1.

Transistor N5 (with transistor N3) is a tail current sink for the differential amplifier which sinks a tail current (determined by the gate voltage applied to N5 by the bias circuit) from Node 4 when transistor N3 is switched "on" by the ROW SELECT signal. The bias circuit forms a current mirror with transistor N5 (the gates of transistors N4 and N5 are connected together), so that the common voltage at the gates of N4 and N5 causes corresponding current to flow to ground through the channel of N4 and through the channel of N5.

The output voltage of the differential amplifier (the voltage at the drain of transistor N11) is asserted via column line C2 to the input terminal of circuit 21, and is also fed back to the gate of transistor N11 (the inverting input of the differential amplifier). In typical implementations of the FIG. 2 circuit, the output voltage at Node 6 during read operations (after the photodiode has been reset) is in the range from about 1 volt to about 3 volts (in contrast with typical implementations of the FIG. 1 circuit in which the output voltage asserted at Node 6 during read operations is in a lower range, from about 0.7 volts to less than 2 volts). The gain provided by the differential amplifier in each cell of the FIG. 2 embodiment of the invention significantly reduces error in the cells' output voltage due to fixed pattern noise (typically the error is reduced by a factor of ten or more relative to the prior art).

Typical implementations of the FIG. 2 embodiment of the invention reduce the error due to fixed pattern noise in the cells' output voltage (at Node 6 of each cell) to about 0.4% (6.7 mV), assuming typical (10%) cell-to-cell variation in the "m-factor" indicative of the amount of back bias on the differential amplifier transistors within each cell. In other words, when a sequence of cells of such an implementation of the FIG. 2 embodiment is read (each cell having been exposed to the same incident light energy), the difference between the highest and lowest cell output voltages (assuming 10% "m-factor" variation from cell to cell) is only about 0.4% of the average output voltage (averaged over all cells).

Optionally, the active pixel sensor cell array of the invention includes a switchable bias circuit for asserting a desired bias voltage to the differential amplifier current source and tail current sink circuitry of each column (e.g., to transistors P1 and N5 of the column comprising cells 100 and 101 of FIG. 2), with the bias voltage level depending on the state of a bias control signal. The bias circuit comprising transistors N4, N5, and P1 and current source I1 can be replaced by such a switchable bias circuit, which would function to turn off transistors P1 and N5 rapidly when desired (in response to a first state of the bias control signal) and to bias transistors P1 and N5 to have desired currents through their channels when desired (in response to a second state of the bias control signal). It may be desirable to conserve power by turning transistors P1 and N5 off rapidly at times when it is not necessary to have current flow through their channels.

It should be understood that it will typically be desirable to implement any of the embodiments of the inventive cell array so that different gain is provided from cell to cell by the differential amplifiers for the individual cells. For example, the FIG. 2 embodiment can be implemented with the transistors N2, N3, and N11 in cell 100 having different characteristics than do the corresponding transistors within cell 101, so that different gain is provided at Node 6 when reading cell 100 than is provided at Node 6 when reading cell 101. This may be desirable for example, when the output of cell 100 indicates intensity of blue light incident at cell 100's photodiode and the output of cell 101 indicates intensity of red light incident at cell 101's photodiode (since a photodiode will typically have different response to red light than to blue light, and thus it is desirable to compensate for such different response by the amount of gain provided in each cell).

It should be understood that various alternatives to the embodiment of the invention described herein may be employed in practicing the invention. For example, the concepts of the present invention can readily be applied to a row of cells in an array of cells. With an array of cells, a detection and calculation circuit (e.g., circuit 21 of FIG. 2) would typically be provided for each column of cells, and bias circuitry (e.g., that comprising elements P2, N4, N6, and I1) would be provided for each column (or shared by the differential amplifier current source and tail current sink for two or more of the columns).

Thus, it is intended that the following claims define the scope of the invention and that structures within the scope of these claims and their equivalents be covered thereby.

What is claimed is:

1. An active pixel sensor cell array, including:
   a first cell connected along a column, where the first cell is an active pixel sensor cell including a photodiode and a reset circuit configured to reset the photodiode in response to a reset signal; and
   a differential amplifier having a first input coupled to the photodiode, a second input, and an output connected to the second input, wherein at least a portion of the differential amplifier is within the first cell, and wherein the differential amplifier is configured to be operable in a mode in which it asserts at the output a first amplified signal indicative of a sampled output voltage of the photodiode and in which the first amplified signal is fed back to the second input.

2. The array of claim 1, also including:
   a second cell connected along the column, where the second cell is an active pixel sensor cell including a second photodiode and a second reset circuit configured to reset the second photodiode in response to a second reset signal; and
   a second differential amplifier having a third input coupled to the second photodiode, a fourth input, and a second output connected to the fourth input, wherein at least a portion of the second differential amplifier is within the second cell, and wherein the second differential amplifier is configured to be operable in a mode in which it asserts at the second output a second amplified signal indicative of a sampled output voltage of the second photodiode and in which the second amplified signal is fed back to the fourth input.

3. The array of claim 2, wherein
   the differential amplifier comprises an amplifier portion and load circuitry, wherein the amplifier portion is within the first cell and the load circuitry is physically separate from the first cell but coupled to said amplifier portion, and wherein
   the second differential amplifier comprises said load circuitry and a second amplifier portion within the second cell, wherein said load circuitry is physically separate from both the first cell and the second cell and coupled to both the second amplifier portion and the amplifier portion.

4. The array of claim 2, wherein the amplifier portion includes a tail current switch, the second amplifier portion includes a second tail current switch, and the load circuitry includes:
   a current source coupled to the output and the second output; and
   a tail current sink coupled to the tail current switch and the second tail current switch.

5. The array of claim 1, wherein the differential amplifier comprises an amplifier portion within the first cell and load circuitry physically separate from the first cell but coupled to the amplifier portion, the column includes a first column line to which the reset circuit of the first cell is connected, a second column line to which the second input and the output are connected, and a third column line, and the load circuitry includes:
   a current source coupled to the second column line; and
   a tail current sink coupled to the third column line.

6. The array of claim 5, wherein the amplifier portion comprises:
   a tail current switch coupled to the third column line and configured to sink a tail current to said third column line in response to a row select signal.

7. The array of claim 6, wherein the amplifier portion also comprises:
- a first NMOS transistor having a drain coupled to the first column line and a source, and whose gate is said first input; and
- a second NMOS transistor having a drain coupled to the second column line and a source coupled to the source of the first NMOS transistor, and whose gate is said second input, and
- wherein the tail current switch is a third NMOS transistor having a source coupled to the third column line, a drain coupled to the source of the second NMOS transistor, and a gate coupled to receive the row select signal.

8. The array of claim 7, wherein the tail current sink is a fourth NMOS transistor having a drain coupled to a first end of the third column line, and a gate, said array also including:
- bias circuitry coupled to the gate of the fourth NMOS transistor and configured to assert a bias voltage to said gate of the fourth NMOS transistor.

9. The array of claim 8, wherein the current source of the load circuitry is a PMOS transistor having a drain coupled to an end of the second column line, a source coupled to receive a supply voltage, and a gate, and the bias circuitry is coupled to the gate of the PMOS transistor and configured to assert a second bias voltage to said gate of the PMOS transistor.

10. The array of claim 9, also including:
- a reset switch coupled to the end of the second column line and configured to reset the second column line to a known potential in response to a control voltage.

11. The array of claim 10, wherein the reset switch is a second PMOS transistor having a drain coupled to the end of the second column line, a source coupled to receive a potential at least substantially equal to the known potential, and a gate coupled to receive the control voltage.

12. An active pixel sensor cell array, including:
- at least a first cell and a second cell connected along a column including a first column line, a second column line, and a third column line, wherein the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal;
- a differential amplifier having a first input coupled to the photodiode, a second input coupled to the second column line, and an output connected to the second input, wherein an amplifier portion of the differential amplifier is within the first cell, the amplifier portion includes a first NMOS transistor, a second NMOS transistor, and a tail current switch, the first NMOS transistor has a drain coupled to the first column line, a source, and a gate, the gate of the first NMOS transistor is said first input, the second NMOS transistor has a drain coupled to the second column line, a source coupled to the source of the first NMOS transistor, and a gate, the gate of the second NMOS transistor is said second input, and the tail current switch is a third NMOS transistor having a source coupled to the third column line, a drain coupled to the source of the second NMOS transistor, and a gate coupled to receive a row select signal; and
- a second differential amplifier having a third input coupled to the second photodiode, a fourth input coupled to the second column line, and a second output connected to the fourth input, wherein an amplifier portion of the second differential amplifier is within the second cell, the amplifier portion of the second differential amplifier includes a fourth NMOS transistor, a fifth NMOS transistor, and a second tail current switch, the fourth NMOS transistor has a drain coupled to the first column line, a source, and a gate, the gate of the first NMOS transistor is said third input, the fifth NMOS transistor has a drain coupled to the second column line, a source coupled to the source of the fourth NMOS transistor, and a gate, the gate of the second NMOS transistor is said fourth input, and the second tail current switch is a sixth NMOS transistor having a source coupled to the third column line, a drain coupled to the source of the fifth NMOS transistor, and a gate coupled to receive a second row select signal.

13. The array of claim 12, also including load circuitry that is physically separate from the first cell and the second cell, said load circuitry including:
- a current source coupled to the second column line; and
- a tail current sink coupled to the third column line, wherein the differential amplifier comprises the amplifier portion and the load circuitry, and the second differential amplifier comprises the second amplifier portion and the load circuitry.

14. The array of claim 13, wherein the current source is a PMOS transistor having a drain coupled to an end of the second column line, a source coupled to receive a supply voltage, and a gate, wherein the tail current sink is a seventh NMOS transistor having a drain coupled to a first end of the third column line and a gate, said array also including:
- bias circuitry coupled to the gate of the seventh NMOS transistor and configured to assert a bias voltage to said gate of the seventh NMOS transistor.

15. The array of claim 14, wherein the bias circuitry is also coupled to the gate of the PMOS transistor and configured to assert a second bias voltage to said gate of the PMOS transistor.

16. The array of claim 12, wherein the first column line is coupled to the reset circuit of the first cell and to the second reset circuit of the second cell.

17. An active pixel sensor cell circuit, including:
- an active pixel sensor cell including a photodiode, and a reset circuit coupled to the photodiode and configured to reset the first photodiode in response to a reset signal; and
- a differential amplifier having a first input coupled to the photodiode, a second input, and an output connected to the second input, wherein at least a portion of the differential amplifier is within the active pixel sensor cell, and
- wherein the differential amplifier is configured to be operable in a mode in which it asserts at the output an amplified signal indicative of a sampled output voltage of the photodiode and in which the amplified signal is fed back to the second input.

18. The circuit of claim 17, wherein the differential amplifier includes a tail current switch within the active pixel sensor cell, and wherein the circuit also includes:
- load circuitry that is physically separate from the active pixel sensor cell, wherein the load circuitry is a portion of the differential amplifier and said load circuitry includes:

a current source coupled to the output; and a tail current sink coupled to the tail current switch.

19. The circuit of claim 18, wherein the column includes a first column line to which the reset circuit is connected, a second column line to which the second input and the output are connected, and a third column line, wherein the current source is coupled to the second column line, and wherein the tail current sink is coupled to the third column line.

20. The circuit of claim 19, wherein the tail current switch is configured to sink a tail current to said third column line in response to a row select signal.

21. The circuit of claim 19, wherein said portion of the differential amplifier within the active pixel sensor cell comprises:

a first NMOS transistor having a drain coupled to the first column line and a source, and whose gate is said first input; and a second NMOS transistor having a drain coupled to the second column line and a source coupled to the source of the first NMOS transistor, and whose gate is said second input, and wherein the tail current switch is a third NMOS transistor having a source coupled to the third column line, a drain coupled to the source of the second NMOS transistor, and a gate coupled to receive the row select signal.

22. The circuit of claim 21, wherein the tail current sink is a fourth NMOS transistor having a drain coupled to a first end of the third column line, and a gate, said circuit also including:

bias circuitry coupled to the gate of the fourth NMOS transistor and configured to assert a bias voltage to said gate of the fourth NMOS transistor.

23. The circuit of claim 22, wherein the current source of the load circuitry is a PMOS transistor having a drain coupled to an end of the second column line, a source coupled to receive a supply voltage, and a gate, and the bias circuitry is coupled to the gate of the PMOS transistor and configured to assert a second bias voltage to said gate of the PMOS transistor.

24. The circuit of claim 23, also including:

a reset switch coupled to the end of the second column line and configured to reset the second column line to a known potential in response to a control voltage.

25. The circuit of claim 24, wherein the reset switch is a second PMOS transistor having a drain coupled to the end of the second column line, a source coupled to receive a potential at least substantially equal to the known potential, and a gate coupled to receive the control voltage.

26. The circuit of claim 17, wherein said portion of the differential amplifier within the active pixel sensor cell includes NMOS transistors but no PMOS transistor.

* * * * *